(12) United States Patent
Stapleton et al.

(10) Patent No.: US 6,462,438 B1
(45) Date of Patent: Oct. 8, 2002

(54) SUPPLY VOLTAGE SEQUENCING

(75) Inventors: Michael A. Stapleton, Portland; Bernard W. Boland, Hillsboro; Jeffery J. Olsen, Banks; John A. Dickerson, Hillsboro, all of OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 09/670,751

(22) Filed: Sep. 27, 2000

(51) Int. Cl.$^7$ ............................................... H01H 35/00
(52) U.S. Cl. ........................................ 307/130; 307/126
(58) Field of Search .................................. 307/116, 126, 307/130; 323/266, 268, 271, 274, 282, 284

(56) References Cited

U.S. PATENT DOCUMENTS 5,307,257 A * 4/1994 Fukushima ................. 323/300
5,691,870 A * 11/1997 Gebara ........................ 307/87
5,774,347 A * 6/1998 Nakanishi ..................... 363/81
6,316,924 B1 * 11/2001 Stapleton et al. ........... 323/273

FOREIGN PATENT DOCUMENTS

EP          0694826 A2 *  7/1994  ......... G05F/1/5777

* cited by examiner

Primary Examiner—Stephen W. Jackson
Assistant Examiner—Sharon Polk
(74) Attorney, Agent, or Firm—Trop, Pruner & Hu, P.C.

(57) ABSTRACT

A method includes converting a first voltage into a second voltage. The second voltage is routed to a power supply line when the second voltage exceeds a first predefined threshold, and the second voltage is isolated from the power supply line when the first voltage decreases below a second predefined voltage.

23 Claims, 4 Drawing Sheets

US 6,462,438 B1

SUPPLY VOLTAGE SEQUENCING

BACKGROUND

The invention generally relates to supply voltage sequencing.

A typical computer system includes a power supply that provides and regulates various supply voltages that are used by and power the components of the computer system. As examples, the computer system may provide and regulate supply voltages for 5 volt (V), 3.3 V, 2.5 V, 1.8 V and 1.5V power planes (also called rails or voltage supply lines) of the computer system.

The power supply does not instantly provide the supply voltages during startup of the computer system. Rather the power supply generally has a transient response that establishes a delay in initially providing, or bringing up, the supply voltages when the computer system is turned on. Furthermore, the power supply may provide some of the supply voltages before others. For example, the power supply may generate a 3.3 V supply voltage for one power plane and further convert the 3.3 V supply voltage to a 1.8 V supply voltage for another power plane. In this manner, there may be a significant delay between when the power supply brings up the 3.3 V supply voltage (that comes up first) and when the power supply brings up the 1.8 V supply voltage. For example, this delay may be attributable to the power supply using a control voltage to convert the 3.3 V supply voltage to the 1.8 V supply voltage, and the power supply may have to wait on the control voltage to come up before the conversion of the 3.3 V supply voltage into the 1.8 V supply voltage takes place. Delays may also exist in the timing in which the power supply removes, or brings down, the supply voltages when the computer system powers down.

A component of the computer system may have a requirement that the difference of two power supply voltages that are received by the component must remain within a predefined voltage range, even during the startup and power down of the computer system. Otherwise, damage to the component may occur.

One possible solution to this problem is to use a converter that does not use a control voltage to convert one supply voltage into another supply voltage. However, such a converter typically is substantially more expensive to make than a converter that uses the control voltage. Another solution may be to use a string of serially coupled diodes to create a voltage drop from one supply voltage to generate another supply voltage. However, a drawback of this solution is that the forward voltage drop of the diodes must be closely controlled in an environment where a variety of different currents may be drawn. Otherwise, the voltage difference specification may be exceeded.

Thus, there is a continuing need for an arrangement that addresses one or more of the problems that are stated above.

DETAILED DESCRIPTION

Figure 1:
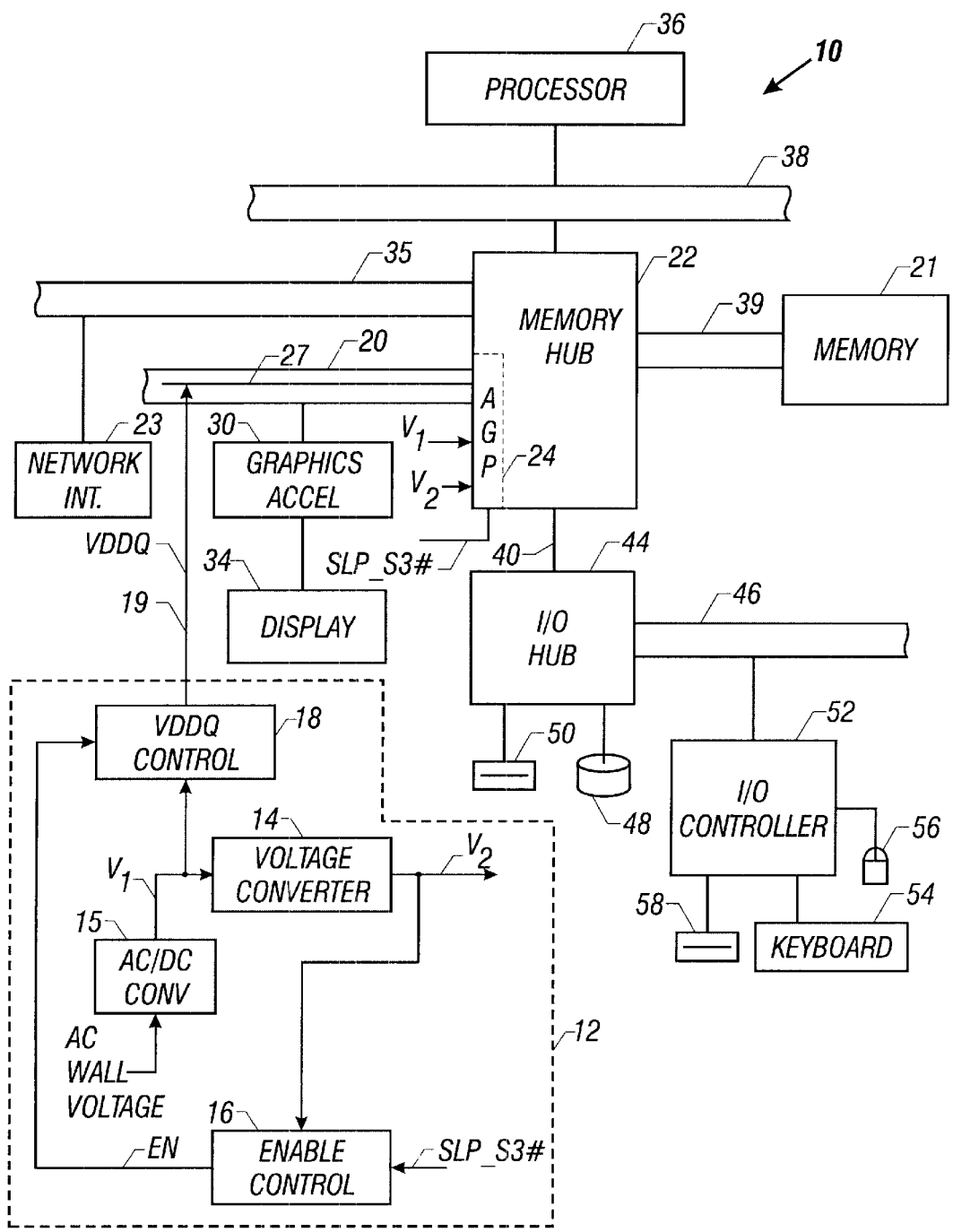
FIG. 1 is a schematic diagram of a computer system according to an embodiment of the invention.

Referring to FIG. 1, an embodiment 10 of a computer system in accordance with the invention includes a power supply subsystem 12 to provide different supply voltages to various supply voltage rails of the computer system 10. The term "rail" may alternatively be referred to as a plane or a line, as just a few examples. The power supply subsystem 12 may include an AC-to-DC converter 15 that receives an AC wall voltage and converts the AC wall voltage into one or more regulated DC supply voltages, such as a DC voltage called $V_1$. The power supply subsystem 12 may also include circuitry, such as a voltage converter 14, to further convert the regulated DC supply voltage(s) into other regulated DC supply voltage(s). For example, the voltage converter 14 may receive the $V_1$ voltage and convert the $V_1$ voltage into another voltage called $V_2$. As an example the $V_1$ voltage may be approximately 3.3 volts, and the $V_2$ voltage may be approximately 1.8 volts, although other voltages are possible.

The supply voltages that are furnished by the power subsystem 12 may be used to provide power to the various components of the computer system 10 and may be furnished to buses of the computer system 10 to power components that are coupled to the buses. For example, the $V_1$ voltage may be routed to supply voltage rail, or line 27, of an Accelerated Graphics Port (AGP) bus 20, and the $V_2$ voltage may be provided to supply power to components (semiconductor devices ("chips"), for example) that are coupled to the AGP bus 20, such as an AGP interface 24 for the AGP bus 20. The AGP is described in detail in the Accelerated Graphics Port Interface Specification, Revision 1.0, published on Jul. 31, 1996, by Intel Corporation of Santa Clara, Calif.

Certain components of the computer system 10 may establish a voltage supply sequencing requirement, a requirement that specifies, for example, that the difference between the $V_1$ and $V_2$ supply voltages must remain within a predetermined range (a range from −2 to 2 volts, as an example) at all times, including when the computer system 10 is powering up or powering down.

A potential difficulty in maintaining this voltage difference within the predetermined range is that a significant delay may exist between the time when the power supply subsystem 12 brings up the $V_1$ supply voltage (that comes up first) and the time when the voltage converter 14 brings up the $V_2$ supply voltage. This delay may be attributable to, for example, the voltage regulator's use of a control voltage to convert the $V_1$ supply voltage into the $V_2$ supply voltage. In this manner, due to the use of the control voltage, the voltage converter 14 may wait on the control voltage to come up before the voltage conversion takes place. Delays may also exist in the timing in which the power supply removes, or brings down, the supply voltages when the computer system powers down.

For purposes of ensuring that the voltage difference remains within the predetermined range, the power supply subsystem 12 includes a control circuit 18 to control when the $V_1$ voltage level appears on the AGP bus 20 supply voltage line 27. In this manner, an output terminal 19 of the control circuit 18 selectively routes the $V_1$ supply voltage (called $V_{DDQ}$ on the line 27) to the supply voltage line 27 in a manner that keeps the difference between the $V_1$ and $V_2$ voltages within the predetermined range. More specifically, when the difference between the $V_1$ and $V_2$ voltages are within the predetermined range, the control circuit 18 routes the $V_1$ voltage to the voltage supply line 27 by setting the $V_{DDQ}$ signal to a voltage level approximately equal to the $V_1$ voltage. However, when the voltage difference is outside of the predetermined voltage difference, such as the case that occurs at power up or power down of the computer system 10, the control circuit 18 tristates its output terminal 19 to remove power from the supply voltage line 27.

In some embodiments of the invention, the operation of the control circuit 18 is controlled by an enable signal (called EN) that is provided by an enable control circuit 16 of the power supply system 12. In this manner, the control circuit 18 receives the $V_1$ voltage, routes the $V_1$ voltage to the output terminal 19 when the EN signal is asserted (has a logic one state, for example) and does not route the $V_1$ voltage to the output terminal 19 when the EN signal is de-asserted (has a logic zero state, for example). Thus, the enable control circuit 16 controls when the $V_1$ supply voltage is provided to the supply voltage line 27 by controlling the logical state of the EN signal.

The enable circuit 16 determines when the EN signal should be asserted and de-asserted based on two signals: the $V_2$ voltage and a signal called SLP_S3#. The SLP_S3# signal is provided by the AGP interface 24 in some embodiments of the invention. The AGP interface 24 asserts (drives low, for example) the SLP_S3# signal when the AGP interface 24 detects that the $V_1$ voltage has decreased below a minimum threshold level and de-asserts (drives high, for example) the SLP_S3# signal otherwise.

In response to the $V_2$ voltage and the SLP_S3# signal, the enable circuit 16 controls the states of the EN signal as follows. The enable control circuit 16 de-asserts the EN signal (drives the EN signal low, for example) when either the SLP_S3# signal is asserted or the $V_2$ signal is below a minimum threshold voltage, conditions that indicate that the difference between the $V_1$ and $V_2$ signals may fall outside the predetermined range.

Figure 3:
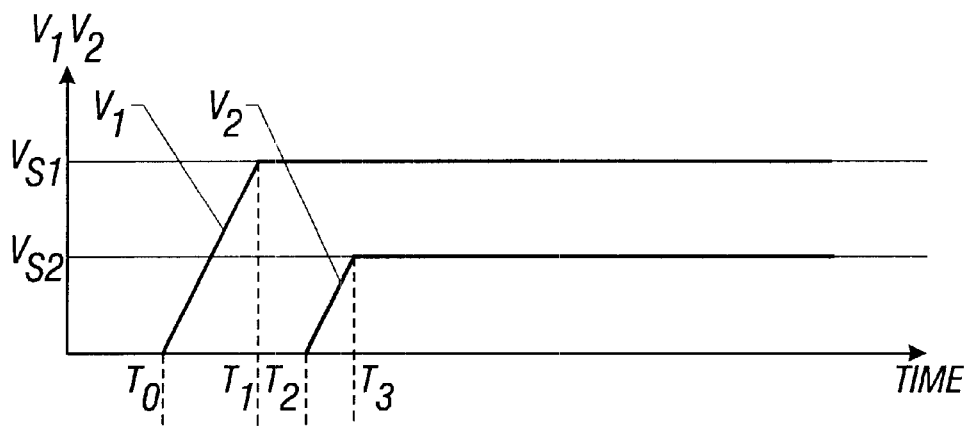
FIGS. 3, 4 and 5 depict signals illustrating operation of the enable control circuit in response to the computer system being turned on according to an embodiment of the invention.
Figure 4:
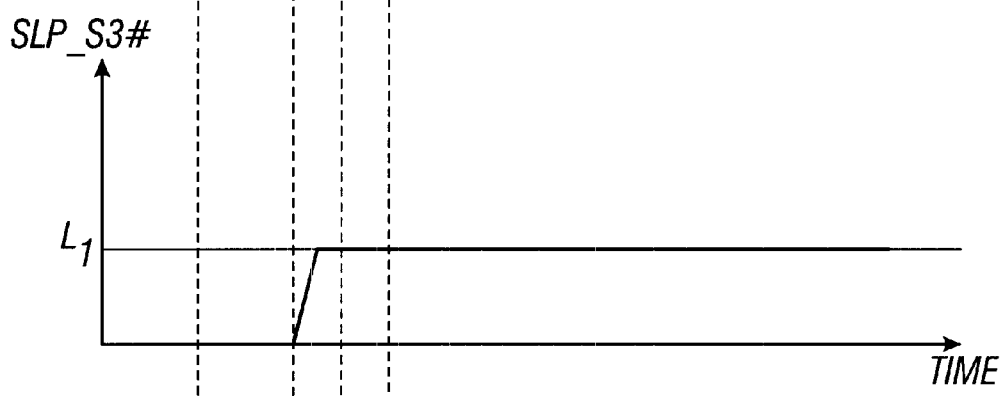
Figure 5:
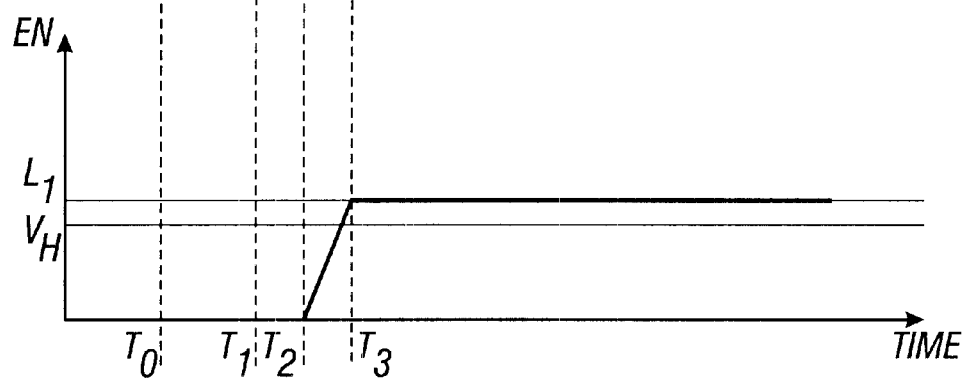

For example, FIGS. 3, 4, and 5 depict a possible scenario before, during and after the initial power up of the computer system 10. Before the computer system 10 is turned on at time $T_0$, the $V_2$ voltage and the SLP_S3# signal have a voltage level of zero volts. After time $T_0$, the computer system 10 is turned on, and the $V_1$ signal rises to its steady state voltage level (called $V_{S1}$ (3.3 volts, for example)) from time $T_0$ to time $T_1$ and remains at the $V_{S1}$ voltage level after time $T_1$. During the time interval from $T_0$ to $T_1$, the SLP_S3# signal is de-asserted (because the $V_1$ signal has not reached the $V_{S1}$ level). Thus, due to the low level of the $V_1$ signal and due to the de-asserted state of the SLP_S3# signal, the enable control circuit 16 keeps the EN signal de-asserted during the $T_0$ to $T_1$ time interval.

At time $T_1$, the $V_1$ voltage reaches its operating voltage level of $V_{S1}$, and in response to this occurrence, the AGP interface 24 asserts the SLP_S3# signal that rises from time $T_1$ to time $T_2$ to its logic one voltage level (called $L_1$). However, in some embodiments of the invention, the enable control circuit 16 does not assert the EN signal in response to the assertion of the SLP_S3# signal, as the $V_2$ voltage may exceed the $V_1$ voltage by more than the predetermined voltage difference because of possible delays that are introduced by the voltage converter 14. Therefore, the enable control circuit 16 asserts the EN signal in response to the $V_2$ voltage rising to its operating level $VS_2$ (1.8 volts, for example). More specifically, in some embodiments of the invention, after the SLP_S3# signal is de-asserted (driven low, for example), the EN signal approximately follows the $V_2$ signal.

For example, as depicted in FIG. 3, from time $T_2$ to time $T_3$, the $V_2$ signal rises from approximately zero volts to its operating level of $V_{S2}$ volts (1.8 volts, for example), and the EN signal follows this rise during the $T_2$ to time $T_3$ time interval, as the EN signal rises from approximately zero volts to its $L_1$ logic one level. During this rise, the EN signal exceeds a logic one threshold level (called $V_H$) that causes the control circuit 18 to route the $V_1$ voltage level (via the $V_{DDQ}$ signal) to the AGP bus 20. When the EN signal reaches the $V_H$ threshold voltage, the difference between the $V_1$ and $V_2$ voltages is within the predetermined range.

Figure 6:
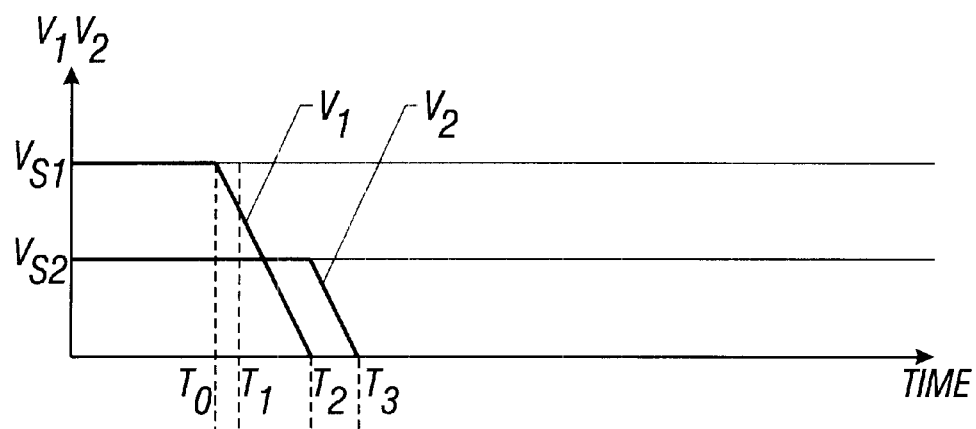
FIGS. 6, 7 and 8 depict signals illustrating operation of the enable control circuit in response to the computer system being turned off according to an embodiment of the invention.
Figure 7:
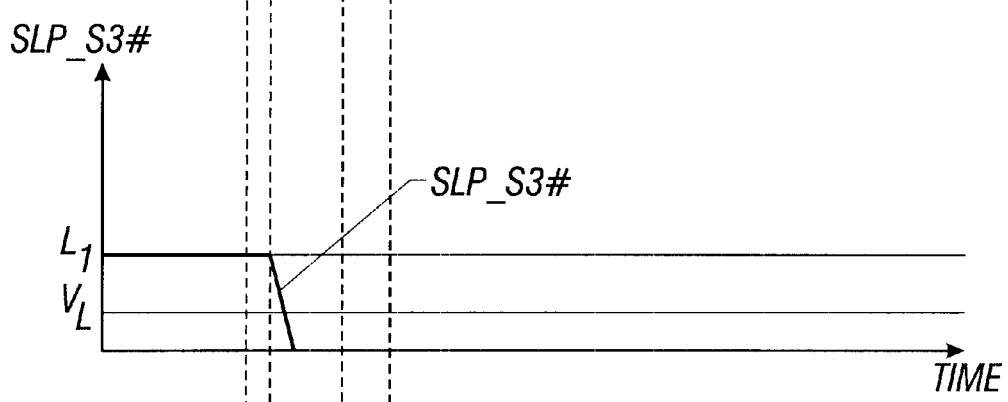
Figure 8:
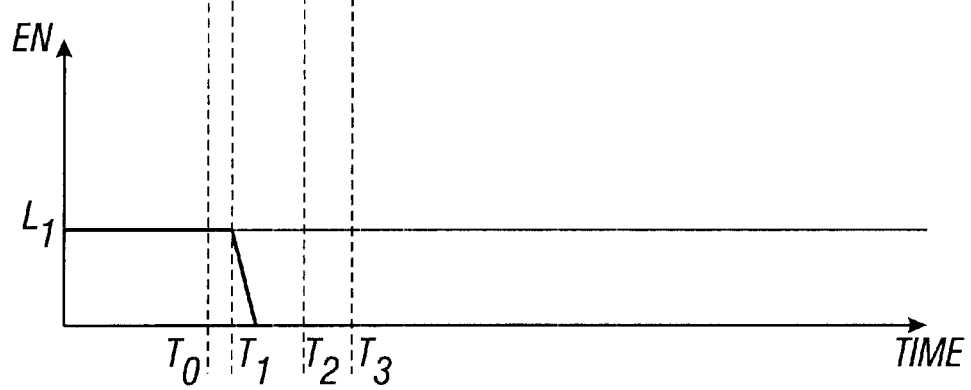

FIGS. 6, 7, and 8 depict a scenario in which the computer system 10 is already powered up and then powers down. After the computer system 10 is powered up and the EN signal is asserted, the enable control circuit 16 monitors the state of the SLP_S3# signal for purposes of determining when to remove the $V_1$ voltage from the AGP bus 20. In this manner, in some embodiments of the invention, the enable control circuit 16 de-asserts the EN signal in response to the de-assertion of the SLP_S3# signal and unlike the case when the EN signal is to be asserted, does not de-assert the EN signal in response to the level of the $V_2$ voltage. Otherwise, due to the delay between the time when the $V_2$ voltage drops and the time when the $V_1$ drops, the predetermined voltage difference may be exceeded.

As an example, FIG. 6 depicts the $V_1$ decreasing from its $V_{S1}$ voltage level at time $T_0$ to zero volts at time $T_2$. The falling VI voltage causes the AGP interface 24 to assert (drive low, for example) the SLP_S3# signal at time $T_1$. The enable control circuit 16 causes the EN signal to follow the SLP_S3# signal. When the EN signal crosses the logic zero threshold voltage (called $V_L$), the control circuit 18 tri-states its output terminal 19 to remove the $V_1$ voltage from the AGP bus 20. It is noted that the $V_2$ voltage begins decreasing from its $VS_2$ voltage level in a delayed response to the decrease of the $V_1$ voltage. The $V_2$ voltage decreases to near zero volts near time $T_3$.

Thus, to summarize, when the $V_1$ voltage is not being routed (via the $V_{DDQ}$ signal) to the AGP bus 20, the enable control circuit 16 uses the $V_2$ voltage to assert the EN signal, and when the $V_1$ voltage is being routed (via the $V_{DDQ}$ signal) to the AGP bus 20, the enable control circuit 16 uses the SLP_S3# signal to de-assert the EN signal.

Figure 2:
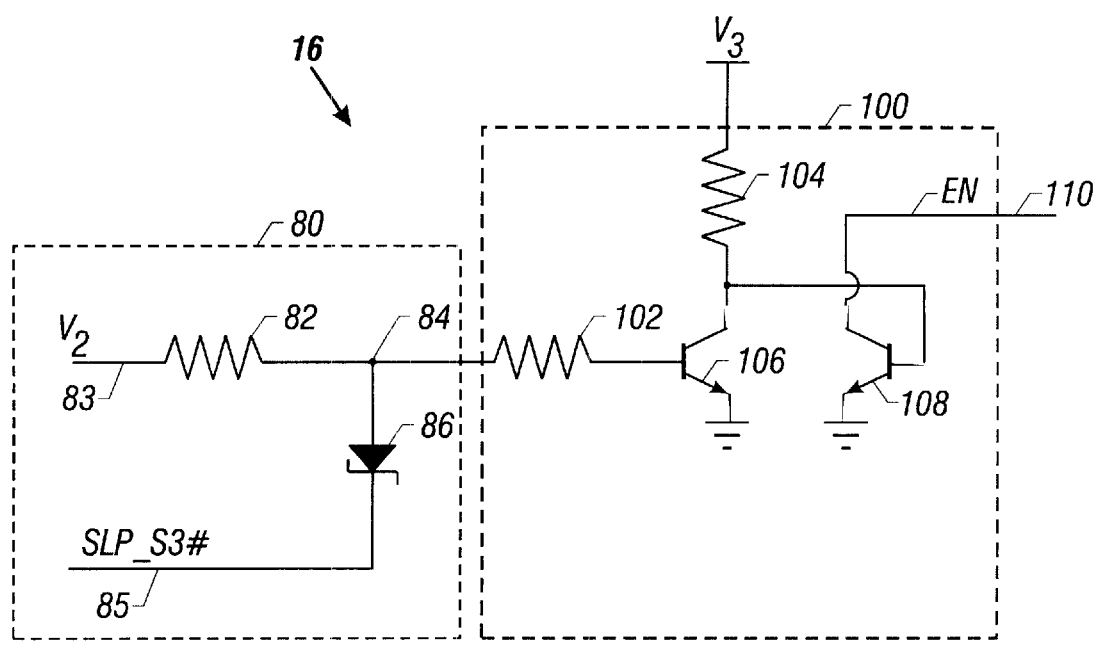
FIG. 2 is a schematic diagram of an enable control circuit according to an embodiment of the invention.

Referring to FIG. 2, in some embodiments of the invention, the enable control circuit 16 includes a sequencing circuit 80 and a level shift circuit 100. The sequencing circuit 80 receives the $V_2$ voltage and the SLP_S3# signal and drives the level shift circuit 100 to produce the EN signal according to the scheme described above. The level shift circuit 100 provides an open collector output that permits the enable control circuit 16 to drive a variety of logic devices, such as CMOS or TTL logic devices. As described below, the level shift circuit 100 may be used to set the logic one level of the EN signal to the appropriate level for the logic device that receives the EN signal. As examples, the level shift circuit 100 may establish the logic one level close to 3.3, 5, or 12 volts.

In some embodiments of the invention, the sequencing circuit 100 includes a resistor 82 that is coupled between an input terminal 83 that receives the $V_2$ voltage and a node 84 that may be viewed as an input node for the level shift circuit 100. The anode of a Zener diode 86 is coupled to the node 84, and the cathode of the diode 86 is coupled to an input terminal 85 that receives the SLP_S3# signal. The EN signal effectively follows the voltage of the node 84. Thus, due to this arrangement, when the SLP_S3# signal is low, the node 84 has a low voltage level to de-assert the EN signal, regardless of the level of the $V_2$ voltage. When the SLP_S3# signal is low, the diode 86 disconnects the terminal 85 from the node 84, and the EN signal is driven high when the $V_2$ signal causes the EN signal to surpass the $V_H$ threshold (see FIG. 5).

The level shift circuit 100 may include a resistor 102 that is coupled between the node 84 and a base terminal of a NPN bipolar junction transistor (BJT) 106. The emitter terminal of the BJT 106 is coupled to ground, and the collector terminal of the BJT 106 is coupled to the base terminal of another NPN BJT 108. A resistor 104 is coupled between the collector terminal of the BJT 106 and a supply voltage (called $V_3$). The collector terminal of the BJT 108 forms an output terminal 110 that provides the EN signal, and the emitter terminal of the BJT 108 is coupled to ground.

Thus, due to this arrangement, the EN voltage follows the voltage at the node 84. The output terminal 110 is pulled up (via a pullup resistor (not shown)) to a voltage level that establishes the logic one level and may have approximately the same voltage level as the $V_3$ supply voltage. Due to this level shifting, the $V_2$ voltage may have a significantly lower steady state voltage than the logic one voltage of the EN signal. For example, the $V_2$ voltage may reach a level of approximately 1.8 volts and the logic one voltage of the EN signal may be approximately 12 volts.

Referring back to FIG. 1, in addition to the power subsystem 12, in some embodiments of the invention, the computer system 10 may include various components that receive power from the power supply subsystem 12. For example, the power subsystem 20 may provide power to a processor 36 of the computer system 10. In this context, the term "processor" may refer to, as examples, to at least one microcontroller, X86 microprocessor, Advanced RISC Machine (ARM) microprocessor, or Pentium microprocessor. Other types of processors are possible and are within the scope of the following claims.

The processor 36 may be coupled to a local bus 38 along with a north bridge, or memory hub 22. The memory hub 22 may represent a collection of semiconductor devices, or "chip set," and provide interfaces to a Peripheral Component Interconnect (PCI) bus 35 and the AGP bus 20. The PCI Specification is available from The PCI Special Interest Group, Portland, Oreg. 97214. A graphics accelerator 30 may be coupled to the AGP bus 20 and provide signals to drive a display 34. The PCI bus 35 may be coupled to a network interface 23, for example. The memory hub 22 may also provide an interface to a memory bus 39 that is coupled to a system memory 21.

A south bridge, or input/output (I/O) hub 44, is coupled to the memory hub 22 via a hub link 40. The I/O hub 44 provides interfaces for a hard disk drive 48, a CD-ROM drive 30 50, and an I/O expansion bus 46, as just a few examples. An I/O controller 52 may be coupled to the I/O expansion bus 46 to receive input data from a mouse 56 and a keyboard 54. The I/O controller 52 may also control operations of a floppy disk drive 58.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   converting a first voltage into a second voltage;
   routing the second voltage to a power supply line when the second voltage exceeds a first predefined threshold; and
   isolating the second voltage from the power supply line when the first voltage decreases below a second predefined threshold.

2. The method of claim 1, wherein the routing and isolating maintain a difference between the first and second voltages within a predetermined range.

3. The method of claim 1, further comprising:
   generating an enable signal; and
   controlling the routing and isolating in response to the enable signal.

4. The method of claim 3, wherein the controlling comprises:
   using the second voltage to generate the enable signal during the routing of the second voltage to the power supply line.

5. The method of claim 4, wherein the using the second voltage to generate the enable signal comprises:
   level shifting the second voltage to generate the enable signal.

6. The method of claim 3, wherein the controlling comprises:
   generating a voltage detection signal indicative of whether the first voltage is above the first predefined threshold; and
   using the voltage detection signal to generate the enable signal.

7. The method of claim 1, wherein the power supply line is part of a bus.

8. The method of claim 7, wherein the bus comprises an Accelerated Graphics Port bus.

9. A system comprising:
   a power supply line to receive a second voltage converted from a first voltage; and
   circuitry to route the second voltage to the power supply line when the second voltage exceeds a first predefined threshold and isolate the second voltage from the power supply line when the first voltage decreases below a second predefined threshold.

10. The system of claim 9, wherein the circuitry maintains a difference between the first and second voltages within a predetermined range.

11. The system of claim 9, wherein the circuitry comprises:
   a first circuit to generate an enable signal; and
   a second circuit to selectively control the routing and isolating in response to the enable signal.

12. The system of claim 11, wherein the first circuit uses the second voltage to generate the enable signal during the routing of the second voltage to the power supply line by the second circuit.

13. The system of claim 12, wherein the first circuit comprises:
   a level shifting circuit to level shift the second voltage to generate the enable signal during the routing of the second voltage to the power supply line.

14. The system of claim 11, wherein
   the circuitry further comprises a third circuit to generate a voltage detection signal indicative of whether the first voltage is above the first predefined threshold, and
   the first circuit uses the voltage detection signal to generate the enable signal.

15. The system of claim 9, wherein the power supply line is part of a bus.

16. The system of claim 15, wherein the bus comprises an Accelerated Graphics Port bus.

17. A computer system comprising:

a converter to convert a first voltage into a second voltage;

a bus comprising a power supply line to receive the second voltage;

a processor coupled to the bus; and circuitry to route the second voltage to the power supply line when the second voltage exceeds a first predefined threshold and isolate the second voltage from the power supply line when the first voltage decreases below a second predefined threshold.

18. The computer system of claim 17, wherein the circuitry maintains a difference between the first and second voltages within a predetermined range.

19. The computer system of claim 17, wherein the circuitry comprises:

a first circuit to generate an enable signal; and a second circuit to selectively control the routing and isolating in response to the enable signal.

20. The computer system of claim 19, wherein the first circuit uses the second voltage to generate the enable signal during the routing of the second voltage to the power supply line by the second circuit.

21. The computer system of claim 19, wherein the first circuit comprises:

a level shifting circuit to level shift the second voltage to generate the enable signal during the routing of the second voltage to the power supply line.

22. The computer system of claim 17, wherein the circuitry further comprises a third circuit to generate a voltage detection signal indicative of whether the first voltage is above the first predefined threshold, and the first circuit uses the voltage detection signal to generate the enable signal.

23. The computer system of claim 17, wherein the bus comprises an Accelerated Graphics Port bus.

* * * * *